INVENTORS.
Michael J. Caparone and
Thomas T. Arden.
BY
THEIR ATTORNEY.

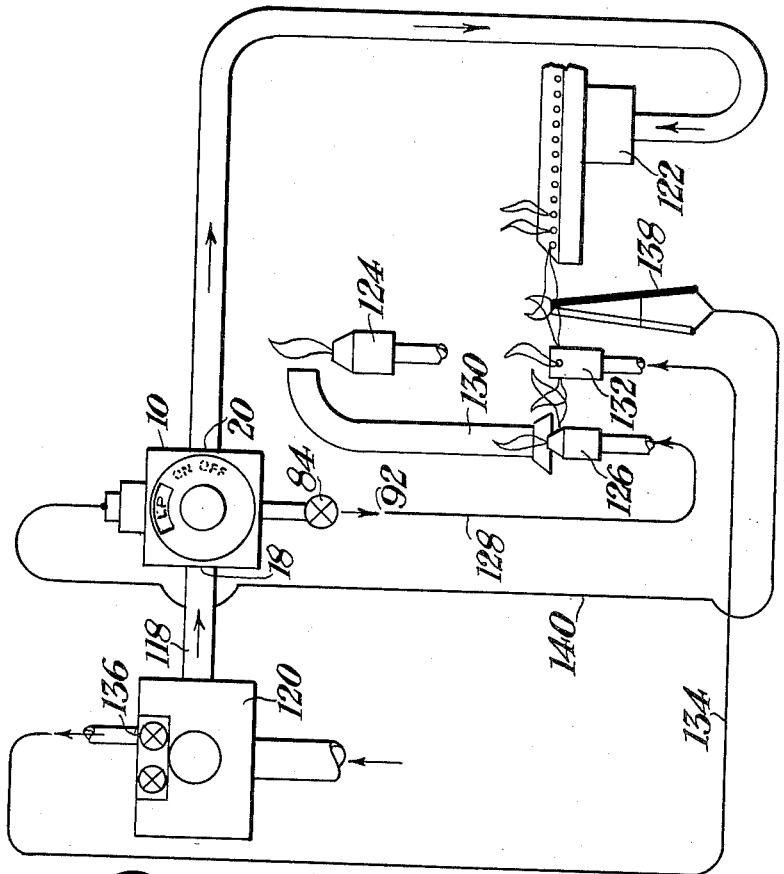
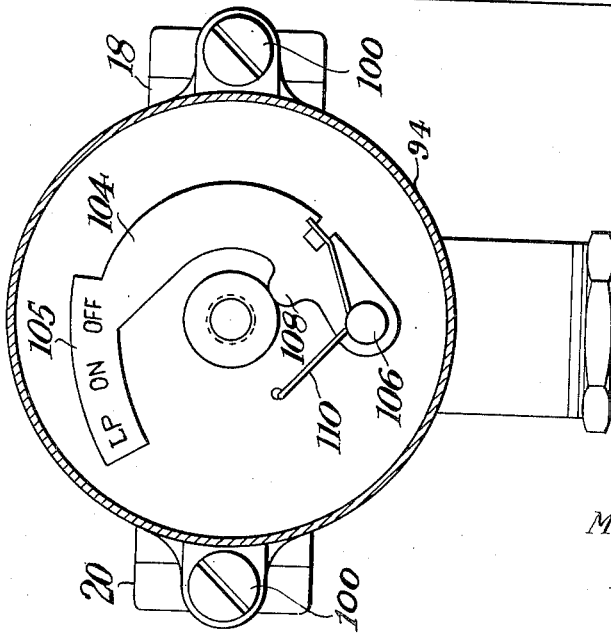
Fig. 3.
Fig. 2.
INVENTORS.
Michael J. Caparone and
Thomas T. Arden.
BY
THEIR ATTORNEY.

Nov. 23, 1954   M. J. CAPARONE ET AL   2,695,056
SAFETY CONTROL AND IGNITION APPARATUS
FOR GASEOUS FUEL BURNERS
Filed Dec. 27, 1945   8 Sheets-Sheet 3
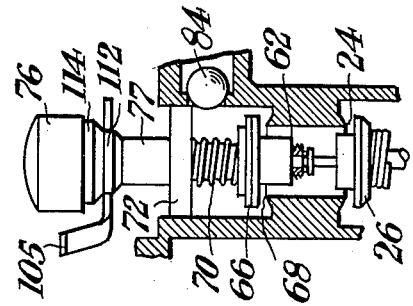
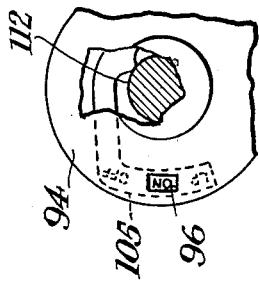
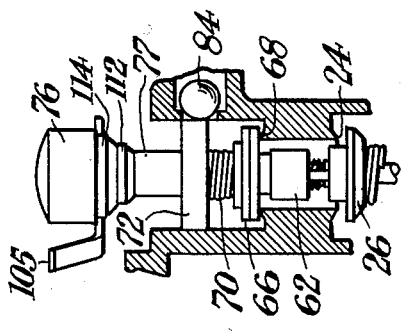
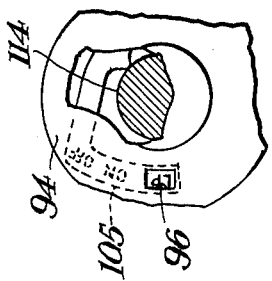
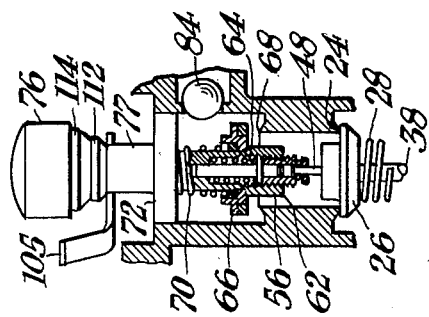
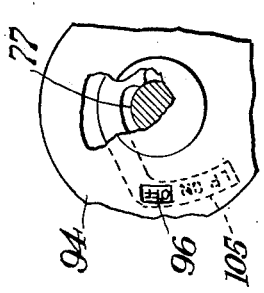
INVENTORS
Michael J. Caparone
and Thomas T. Arden.
BY
THEIR ATTORNEY.

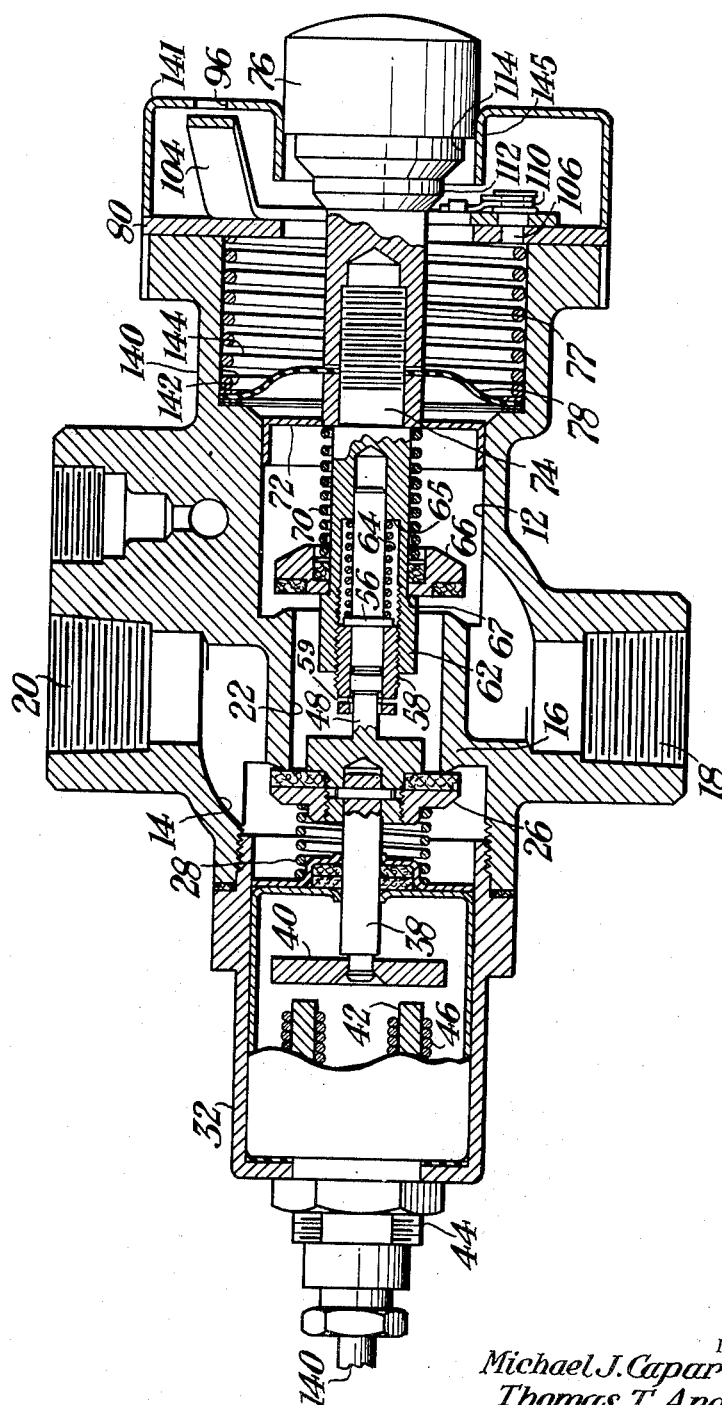

INVENTORS
Michael J. Caparone
and Thomas T. Arden.
BY
THEIR ATTORNEY.

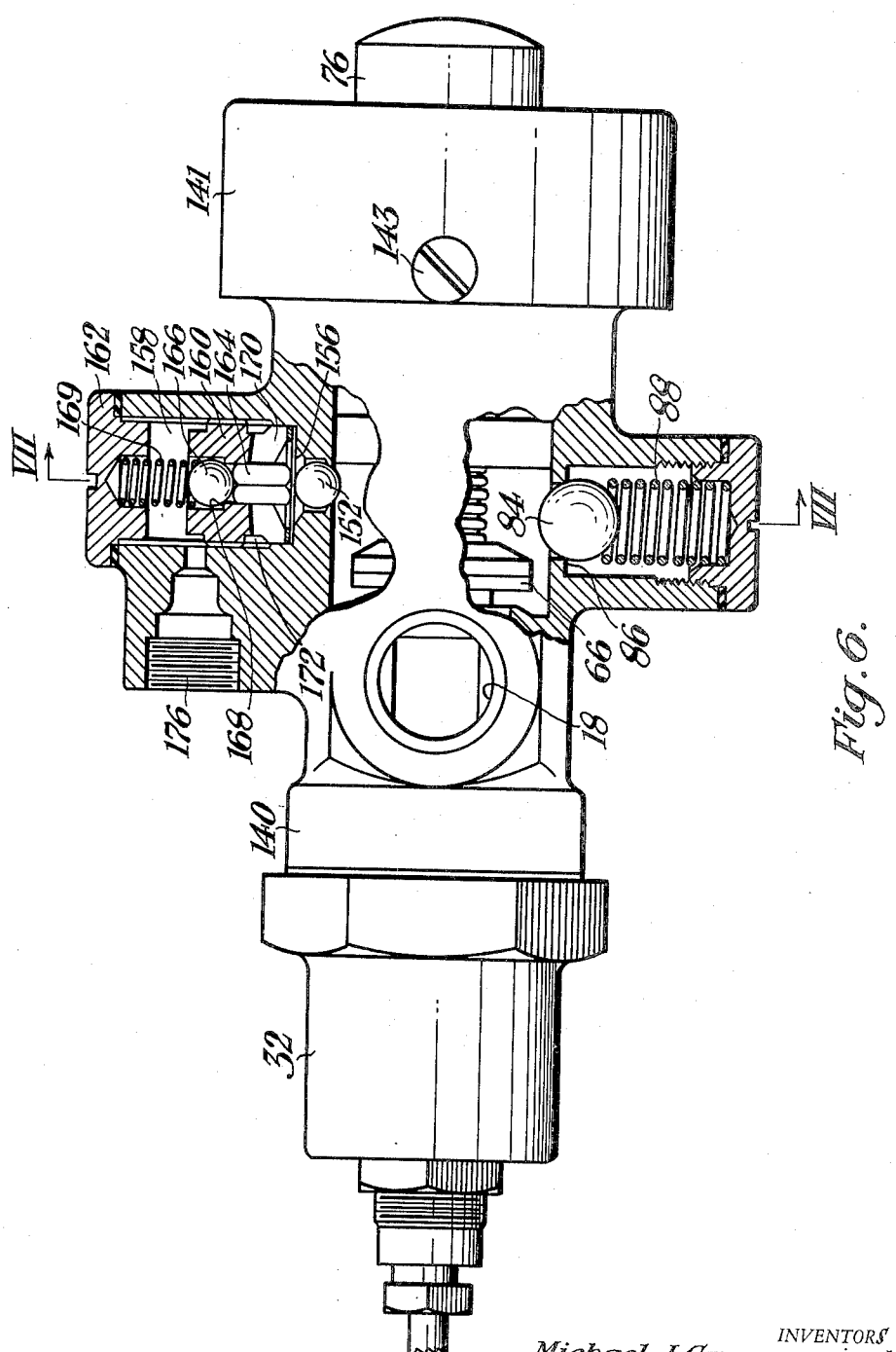

Nov. 23, 1954
M. J. CAPARONE ET AL
SAFETY CONTROL AND IGNITION APPARATUS
FOR GASEOUS FUEL BURNERS
2,695,056
Filed Dec. 27, 1945
8 Sheets-Sheet 7
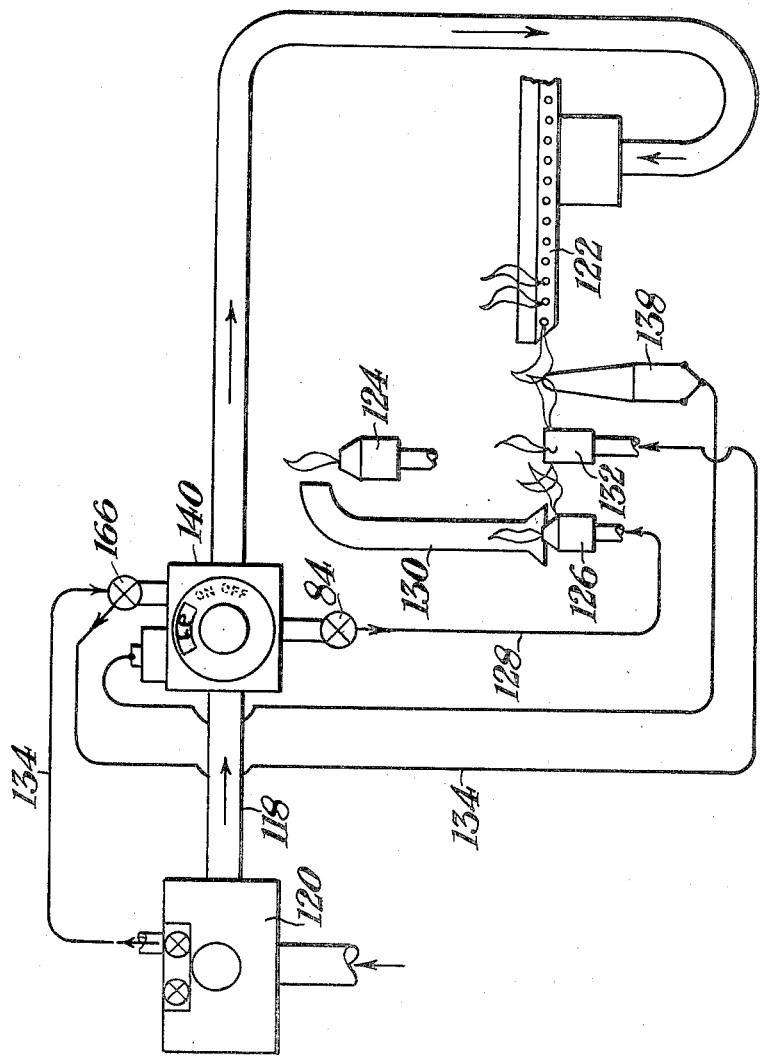
INVENTORS
Michael J. Caparone and
Thomas T. Arden.
BY
THEIR ATTORNEY.

Nov. 23, 1954   M. J. CAPARONE ET AL   2,695,056
SAFETY CONTROL AND IGNITION APPARATUS
FOR GASEOUS FUEL BURNERS
Filed Dec. 27, 1945                               8 Sheets-Sheet 8
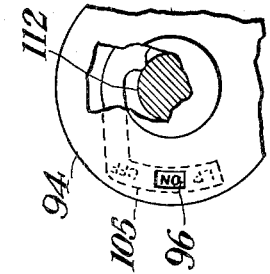
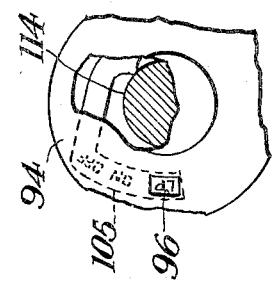
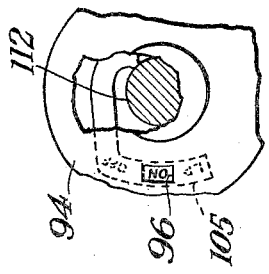
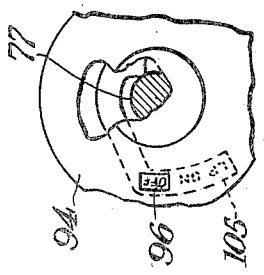
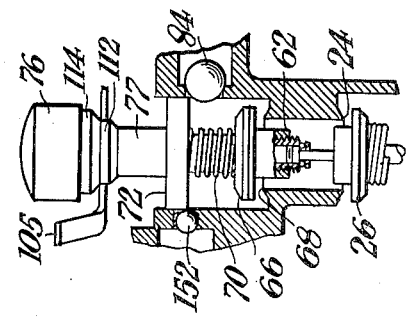
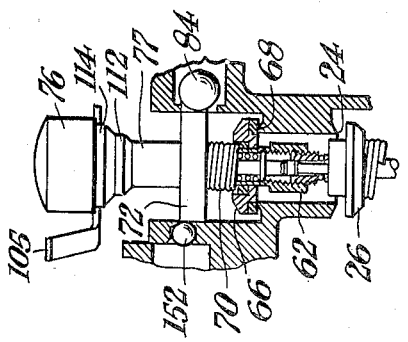
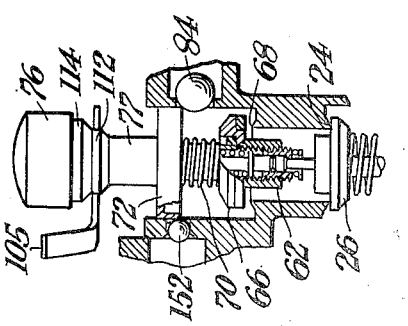
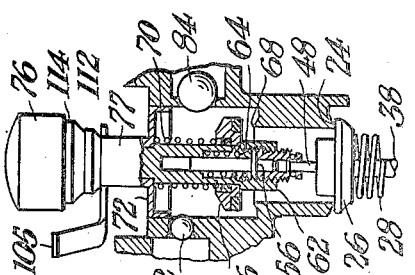
INVENTORS
Michael J. Caparone and
Thomas T. Arden.
BY
THEIR ATTORNEY.

2,695,056

SAFETY CONTROL AND IGNITION APPARATUS FOR GASEOUS FUEL BURNERS

Michael J. Caparone, Monterey Park, and Thomas T. Arden, Rancho La Habra, Calif., assignors to Robertshaw-Fulton Controls Company, a corporation of Delaware Application December 27, 1945, Serial No. 637,332

20 Claims. (Cl. 158—131)

This invention relates to safety control and ignition apparatus for gaseous fuel burners and, more particularly, to thermomagnetic safety controls for flash-tube ignition systems for oven burners.

It has been proposed to provide automatic ignition for the oven burners of domestic gas ranges by means of a flash-tube extending between the constant burning top pilot burner and an oven pilot burner. It is apparent that safety requirements render it necessary that the flow of fuel to the main oven burner be prevented until the oven pilot burner has been ignited. Moreover, if the pilot burner flame should become extinguished it is desirable that the flow of fuel to the main burner or to both the main and pilot burners automatically becomes shut off. In addition, there are other features desirable for safety and to produce operating economy and reliability which should be included in a complete system of the type indicated as will be hereinafter apparent.

An object of this invention is to safely control a flash-tube ignition system by thermomagnetic means responsive to the condition of the burner.

Another object of the invention is to shut off the flow of fuel to the ignition pilot burner automatically after successful ignition has occurred.

Another object of the invention is to prevent the flow of fuel to the main oven burner until the ignition pilot burner has become ignited from the flash-tube.

Another object of the invention is to dispense with extraneous sources of energy for effecting the safety control and ignition of the oven burner.

Another object of the invention is to indicate visually the condition of the control system during any portion of its cycle so that the operator readily can ascertain whether the oven burner has been successfully lighted.

Other objects and advantages will become apparent from the following description taken in connection with the accompanying drawings, wherein:

Fig. 2 is a cross section taken on the line II—II of Fig. 1;

Fig. 3 is a schematic view of an oven burner installation embodying the control device of Figs. 1 and 2;

Figs. 3a and 3b are partial plan and sectional views respectively of a portion of the control device illustrating one stage in the operation thereof;

Figs. 3c through 3f are similar views illustrating other stages in the operation thereof;

Fig. 4 is a longitudinal sectional view of a modified form of the control device shown in Fig. 1;

Fig. 6 is a plan view, partly in section, of the control device shown in Fig. 4;

Fig. 8 is a schematic view of an oven installation embodying the control device shown in the preceding Figs. 4 through 7;

Figs. 8a and 8b are partial plan and sectional views respectively of a portion of the control device shown in Figs. 4 through 8 illustrating one stage in the operation thereof; and Figs. 8c through 8h are similar views illustrating other stages in the operation thereof.

Figure 1:
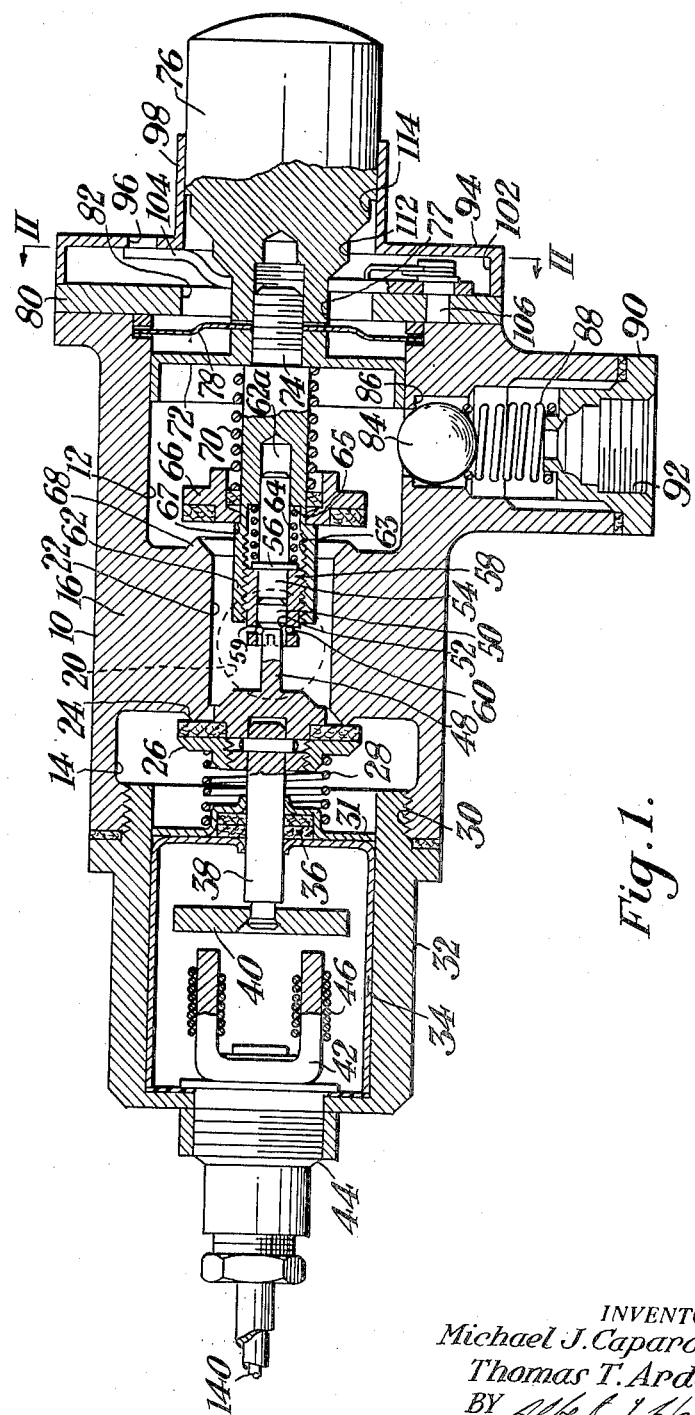
Fig. 1 is a longitudinal sectional view of a control device embodying the invention.

Referring more particularly to Figs. 1 and 2 of the drawings, the control device shown therein comprises a casing 10 having an inlet chamber 12 and an outlet chamber 14 separated by a partition 16. Passage for fuel to the inlet chamber 12 is provided by an inlet opening 18 which communicates therewith and with the exterior of the casing 10. Similarly, passage for fuel from the outlet chamber 14 is provided by an outlet opening 20 which is positioned opposite the inlet opening 18 and communicates with the outlet chamber 14 and the exterior of the casing 10 as shown more clearly in Fig. 4. Communication between the chambers 12 and 14 is provided by a passage 22 extending through the partition 16 axially of the casing 10.

A valve seat 24 is provided on the face of the partition 16 in the outlet chamber 14. A safety valve member 26 is adapted to engage the valve seat 24 for controlling passage of fuel from the passage 22 to the outlet chamber 14. The valve member 26 is biased toward the valve seat 24 by a coil spring 28 which is supported upon a cup-shaped member 31 positioned at the inner end of an end cap member 32. The end cap member 32 has an annular threaded connection 30 for securing it to the casing 10 of which it forms a continuation. The cup-shaped member 31 closely engages the inner wall of the member 32 and is secured thereto forming an abutment at one end spaced from the valve member 26.

The end cap member 32 forms an enclosure for a magnet housing 34 having an end wall abutting an outer portion of the cup-shaped member 31 and providing a recess 36 at the inner portion thereof. Extending through the recess 36 and adapted to be sealed against leakage by suitable packing therein is a connecting stem 38 projecting from the valve member 26. The opposite end of the stem 38 is secured to an armature 40 positioned within the magnet housing 34 and supported by the stem for axial movement in the housing. The armature 40 is adapted for cooperation with a horseshoe magnet 42 which is also located within the magnet housing 34. The magnet 42 is rigidly supported on a hollow terminal connection 44 carried by the end wall of the cap member 32. The arrangement is such that when the valve member 26 is engaged with the valve seat 24, the armature 40 is spaced from the pole faces of the horseshoe magnet 42 but is adapted to be moved into attracted relation therewith when the valve member 26 is fully disengaged from the seat. The horseshoe magnet 42 is provided with the usual winding 46 and is electrically connected through the terminal connection 44 with a suitable source of electrical energy which will be described more fully hereinafter.

The valve member 26 is provided with a valve stem 48 projecting therefrom on the side opposite the stem 38 and thus through the passage 22. The valve stem 48 terminates in an enlarged head 50 providing a tapered shoulder 52 at the junction with the stem 48. The head 50 abuts a valve stem extension 54 provided with an integral collar 56 intermediate its ends. A threaded thimble 58 extends from one side of the collar 56 beyond the shoulder 52 and carries a pair of oppositely disposed slots 59 for the reception of a horseshoe retaining spring 60 which engages the shoulder 52 to prevent withdrawal of the valve stem 48 from the thimble 58. The thimble 58 has preferably a close sliding fit on the valve stem head 50 and is adapted for slidable movement, relative to the valve stem extension 54 and the valve stem head 50, out of abutting engagement with the shoulder 56, as will be apparent hereinafter. It will be understood that the valve stem 48 and the valve stem extension 54 are made separate to facilitate assembly of the thimble 58, that is if the thimble 58 were split longitudinally for example, it would be feasible to make the valve stem 48 and valve stem extension 54 integral.

The valve member 26 is adapted to be moved from its seat 24 and the armature 40 consequently moved into engagement with the pole faces of the horseshoe magnet 42 by a manual resetting operation. To this end, a reset stem 62 is provided and has a threaded axial recess 63 at its inner end for engagement with the threaded thimble 58. The recess 63 terminates in a shoulder 65 spaced from the thimble 58. A coil spring 64 is operative between the abutment formed by the side of the shoulder 56 opposite that engaged by the thimble 58 and the abutment formed by the shoulder 65 in the reset stem 62 and serves as an override spring as will be explained hereinafter. The coil spring 64 serves to bias the valve stem extension 54 so that the shoulder 56 abuts against the adjacent end of the thimble 58. A bearing for the end of the extension 54 is provided by a bore 62a extending inwardly of the reset stem from shoulder 65 thereon and of sufficient depth to permit relative slidable movement Means are provided to interrupt the flow of fuel through the passage 22 during the resetting operation and takes the form of a closure disc 66 slidably mounted on the reset stem 62 for cooperation with a seat 68 formed on the face of the partition 16 in the inlet chamber 12. The closure disc 66 is biased into engagement with a shoulder 67 forming a second abutment on the reset stem 62 by a coil spring 70 operative between the closure disc 66 and a cup-shaped element 72 which forms an abutment for the adjacent end of the spring 70. The cup-shaped element 72 slidably engages the wall of the inlet chamber 12 and is connected to a threaded extension 74 of the reset stem 62 for movement therewith. A reset button 76 projecting exteriorly of the casing 10 is also connected to the threaded extension 74 and provides for manual operation of the reset stem 62. Interposed between a reduced end 77 on the reset button 76 and the cup-shaped element 72 is a sealing diaphragm 78 which is clamped adjacent its periphery to the casing 10 by an end plate 80 having an enlarged opening 82 therethrough for passage of the reset button 76.

The cup-shaped element 72 is adapted to operate an auxiliary valve member 84 in the form of a ball which projects slightly within the inlet chamber 12 and is located intermediate the cup-shaped member 72 in its biased position and the seat 68 for the closure disc 66. Thus, upon movement of the reset stem 62 during the resetting operation, the cup-shaped element 72 will engage the auxiliary valve member 84 to operate the same in a path normal to that of the closure disc 66 which is moved into engagement with the seat 68. The auxiliary valve member 84 is biased into engagement with a valve seat 86 formed in the casing 10 substantially ninety degrees from the inlet opening 18 by a coil spring 88 which engages at its opposite end with a connection 90 having a threaded opening 92 for the end of a pipe or conduit, to be described hereinafter.

Means for indicating the position of the safety valve member 26 and the auxiliary valve member 84 are provided and include a cup-shaped housing 94 having a window 96 therein and an annular flange 98 projecting around and forming a support for the reset button 76. The housing 94 is adapted to be connected to the plate 80 by common screws 100 which also connect the plate to the casing 10. A lever 104 is located within a chamber 102 formed between the plate 80 and housing 94 and is fulcrumed at one end on a pin 106 projecting from the plate 80 substantially parallel with the reset stem 62. The lever 104 is thus adapted to rotate in a plane substantially normal to the axis of the reset stem 62. The lever 104 is of generally V-shaped conformation and carries indicia "Light Pilot," "On" and "Off" for equivalent positions of the auxiliary and safety valves. The lever 104 further carries a projection 108 on the inner side thereof which is adapted to be maintained in engagement with the reset button 76 by a hairpin spring 110. The spring 110 is conveniently carried intermediate its ends on the pin 106 and has one end secured to the plate 80 and the opposite end secured to the lever 104. The reset button 76 carries cam means which serves to rotate the lever 104 by engagement with the projection 108 thereon when the reset button 76 is manually operated during the resetting operation. The cam means may comprise stepped portions 112 and 114 formed on the reset button 76 and providing, with the reduced end portion 77 thereon, for sequential exposure of the indicia opposite the window 96 as the reset button 76 is operated.

The operation of the control device will be described in connection with the schematic embodiment of Fig. 3 wherein similar reference numerals denote corresponding parts. The casing 10 is arranged with the inlet opening 18 therein connected to a main fuel pipe 118 having its opposite end connected to a main fuel cock 120. If desired, the main fuel cock 120 may embody thermostatic control means of any known form responsive to the oven temperature for controlling the flow of fuel in the main fuel pipe 118. Fuel flowing from the outlet 20 of the casing 10 is conducted through the main fuel pipe 118 to the main burner 122 of a domestic range oven. The main burner 122 is adapted to be ignited from a constant burning top pilot burner 124 which may be supplied with fuel from the main fuel pipe 118 anterior of the main fuel cock 120. A flash pilot burner 126 is located in proximity of the main burner 122 and is supplied with fuel by a pipe 128 connected to the outlet 92 controlled by the auxiliary valve member 84. A flash-tube 130 extends between the top pilot burner 124 and the flash pilot burner 126 for causing ignition of the latter. If desired, an ignition pilot burner 132 may be located in proximity of both the main burner 122 and the flash pilot burner 126. In such event, the ignition pilot burner is supplied with fuel by a pipe 134 connected to a by-pass 136 controlled by the main fuel cock 120 in order that fuel may be supplied to the ignition pilot burner 132 when the thermostat has operated to discontinue flow of fuel to the main burner 122.

The winding 46 of the horseshoe magnet 42 is connected by wires 140 to a thermocouple 138 located to be heated by a flame at the main burner 122 and the ignition pilot burner 132. The thermocouple 138 forms a thermoelectric generator for supplying energy to the horseshoe magnet 42. However, the energy so supplied is insufficient to attract the armature 40 into engagement with the pole faces of the horseshoe magnet 42 but is capable of retaining the armature in such attracted position after the manual resetting operation has effected engagement therebetween.

Referring more particularly to Figs. 1 and 2 and to the illustrated stages of operation in Figs. 3a—3f inclusive, it is apparent when the reset button 76 is in the unoperated position shown in Figs. 3a and 3b, then the indicating flag 105 is in the position with the indicia "Off" visible through the window 96. This is due to the reset stem being fully retracted so that the projection 108 is in contact with the reduced end portion 77 of the reset button 76. To place the system in operation, the main fuel cock 120 is first opened permitting fuel to flow to the casing 10 through the main fuel pipe 118 and also to the ignition pilot burner 132 through the fuel pipe 134. It may be assumed that fuel is already flowing to the top pilot burner 124 and that this burner is producing a flame.

The reset button 76 is now depressed to its full extent so that the stepped portion 112 rides past the projection 108 on the lever 104 and the stepped portion 114 finally engages the projection 108. This stage of operation is shown in Figs. 3c and 3d. Such operation will cause the flag 105 to move past the window 96 until the legend "Light Pilot" is visible therein indicating that auxiliary valve member 84 is open and fuel is being supplied to the flash pilot burner 126. During this movement of the reset stem 62, the cup-shaped element 72 and the closure disc 66 are moved axially toward the left, as viewed in Fig. 1, which carries the thimble 58 and the retaining spring 60 along the valve stem 48 and separates the thimble 58 from the shoulder 56 by slight compression of the coil spring 64. The closure disc 66 remains seated on the shoulder 67 as the coil spring 70 is not compressed at this time. The valve member 26 is retained on the valve seat 24 due to the bias of the coil spring 28 being considerably stronger than that of coil spring 64.

The closure disc 66 now becomes engaged with its seat 68 and further axial movement thereof is prevented. Upon further movement of the reset button 76 to reach "Light Pilot" position the bias of coil spring 70 is overcome and the shoulder 67 becomes separated from the closure disc 66. Thus, by the manual pressure applied to the reset button 76, the reset stem 62 and thimble 58 move further to the left relative to the valve stem 48 to bring thimble 58 into engagement with the valve member 26. The valve member 26 is now moved off its seat by overcoming the bias of the coil spring 28 while further compression of the springs 70 and 64 occurs. The override function of coil spring 64 is now apparent inasmuch as valve member 26 can be unseated after closure disc 66 is seated. Thus, closure disc 66 being closed prevents flow of fuel through passage 22 during the opening movement of valve 26. Due to the connection of the armature 40 to the valve member 26 by connecting stem 38, the former is placed in engagement with the pole faces of the horseshoe magnet 42 when the valve member 26 is fully opened. The position shown in Fig. 3d is now reached and it will be noted that the cup-shaped element 72 has engaged the auxiliary valve member 84 and has operated it to open position.

The fuel from the main fuel pipe 118 flows through the outlet 92 and the fuel pipe 128 to the flash pilot burner 126. The fuel issuing from the flash pilot burner 126 is conducted by the flash tube 130 to the top pilot burner 124 where it is ignited and the flash is then conducted by the flash-tube 130 to the flash pilot burner 126 to produce a flame at this burner. The fuel issuing from the ignition pilot burner 132 is now ignited by the flame of the flash pilot burner 126 and the thermocouple 138 soon becomes sufficiently heated by the flame to generate a current which is conducted through the described circuit for energizing the winding 46. The horseshoe magnet now being energized, the armature 40 is held in attracted position against the pole faces thereof.

The reset button 76 is now released to bring the parts to the position shown in Figs. 3e and 3f with both the valve member 26 and the closure disc 66 unseated. This releasing action permits the bias of override spring 64 to cause retraction of the reset stem 62 relative to the valve stem 48 which is held stationary due to engagement of the armature with the magnet 42. It will be observed that the thimble 58 was previously moved a greater distance from the shoulder 56 than the closure disc 66 was moved away from the shoulder 67. Consequently, the subsequent release of the reset button 76 causes the shoulder 67 on the reset stem 62 to reengage the closure disc 66 before the thimble 58 can reengage the shoulder 56. Since the closure disc 66 is now reengaged with the shoulder 67 on the reset stem 62 under bias of the override spring 64 it becomes disengaged from its seat 68 while the cup-shaped element 72 is moved sufficiently far back to discontinue the force exerted thereby on the auxiliary valve member 84 which thereupon closes. Further retraction of the reset stem 62 is now prevented by engagement of the shoulder 56 with thimble 58. Thus, although the flow of fuel to the flash pilot burner 126 is now cut off by closure of auxiliary valve member 84, the ignition pilot burner 132 is still producing a flame and the flow of fuel through the passage 22 to the outlet chamber 14 and by way of outlet 20 to the main burner 122 is no longer obstructed by the closure disc 66.

It will be observed that the engagement of the thimble 58 with the shoulder 56 while the armature 40 is held in attracted position against the pole faces of the magnet 42 will prevent the reset button from being fully retracted to its initial unoperated position. Thus, as shown in Fig. 3f, the projection 108 of the indicator is engaged with the step 112 of the reset button 76 and the indicia "On" appears in the window 96 indicating that safety valve 26 is open and fuel is being supplied to the main burner 122. The spring retainer 60, by its engagement with the shoulder 52, serves to prevent vibration from causing the reset stem 62 to move to the right, as viewed in Fig. 1, while the valve member 26 is being held off its seat. Such movement would obviously cause the indicator flag 105 to indicate that the control is in the "Off" position instead of "On" as actually would be the case. As previously mentioned, however, if the valve stem 48 and the valve stem extension 54 were made in one piece, then the spring retainer 60 would be unnecessary as such movement could not occur.

When the winding 46 of the magnet 42 becomes deenergized by extinguishment of the burner flame either accidentally or by turning off of the main fuel cock 120, then the parts move to the initial position shown in Fig. 3b. That is, the armature 40 becomes disengaged from the pole faces of the magnet 42 causing the valve member 26 to become engaged with its seat 24. The override spring 64 and the coil spring 70 resume their full bias and the cup-shaped element 72 and reset button 76 become fully retracted to their initial positions. The reduced portion 77 of the reset button 76 is now engaged with the projection 108 of the lever 104 and the indicia "Off" appears in the window 96.

In the modification illustrated in Figs. 4 to 8 inclusive and in the views of the operating stages, Figs. 8a to 8h inclusive, the sequence of operation is the same as that described in connection with the previous embodiment and similar reference numerals have been applied where possible. The modified control device comprises a casing 140 having an inlet chamber 12 and an outlet chamber 14 separated by the partition 16. Passage for fuel to the inlet chamber 12 is provided by an inlet opening 18 which communicates therewith and with the exterior of the casing 140. Similarly, passage for fuel from the outlet chamber 14 is provided by an outlet opening 20 which is positioned opposite the inlet opening 18 and communicates with the outlet chamber 14 and the exterior of the casing 140. Communication between the chambers 12 and 14 is provided by a passage 22 extending through the partition 16 axially of the casing 140.

The safety valve 26 and valve seat 24 are similar to those of the previously described embodiment as well as the coil spring 28 which biases the valve member 26 toward the valve seat 24. The horseshoe magnet 42 is provided with the winding 46 and terminal connection 44, all of which are housed within the end cap member 32 secured to the casing 140. Cooperation between the armature 40 and the horseshoe magnet 42 is effective for retaining the armature in attracted position when the valve member 26 is disengaged from its seat and the winding 46 is receiving current from the source of electrical energy.

At the opposite end of the casing 140 is the reset button 76 secured to the reset stem 62 as in the previously described embodiment. The thimble 58 and override spring 64 are also provided and operate in identical fashion with that described in connection with the former modification. The flexible sealing member 78 is in this instance retained in sealing engagement with the wall of a recess 142 formed in the casing 140 beyond the cup-shaped member 72. The retaining means comprises a coil spring 144 operative between the sealing member 78 and the plate 80. The position indicating means are located in a housing 141 secured by screws 143 to the casing 140 and having an inturned flange 145 supporting the button 76.

Figure 7:
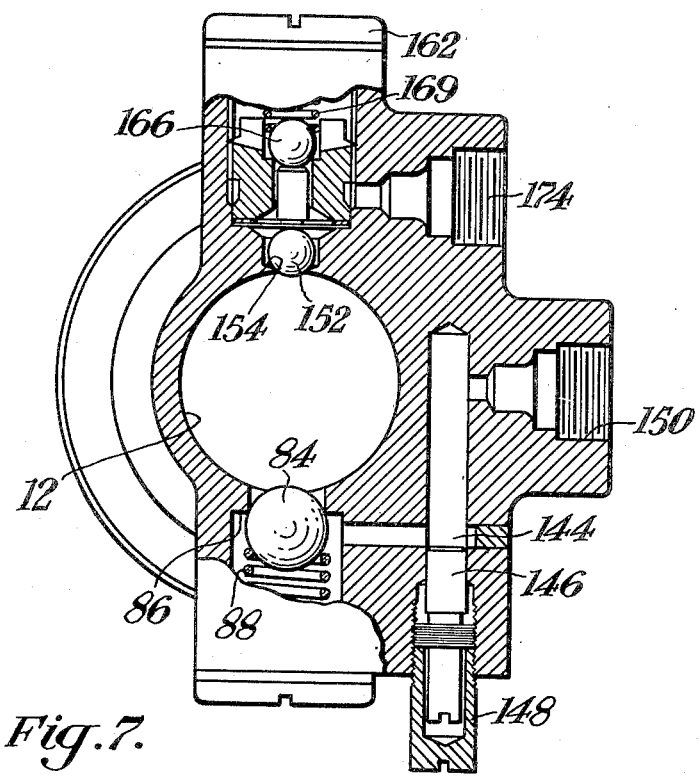
Fig. 7 is a cross section taken on the line VII—VII of Fig. 6.
Figure 5:
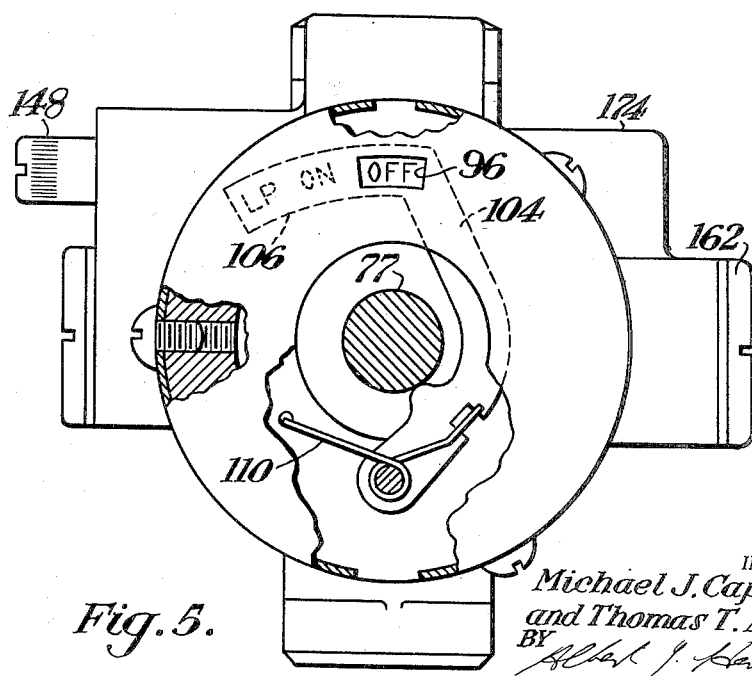
Fig. 5 is an end view, partly in section, of the control device shown in Fig. 4.

The auxiliary valve member 84 in this embodiment is also located substantially ninety degrees from the inlet opening 18 and is adapted to be moved off its seat by the cup-shaped element 72. However, means are provided in this embodiment to adjust the flow of fuel to the flash pilot burner 126. To this end, as shown in Fig. 7, the chamber for the auxiliary valve spring 88 is provided with an angular passage 144 which is adapted to be partly or fully closed off by an adjusting member 146 having threaded engagement with the casing 140 and projecting to the exterior thereof. A closure cap may be provided for the adjusting member 146 to deter tampering therewith once the adjustment has been effected. The passage 144 communicates with the lateral opening 150 in the casing 140 which is suitably threaded for connection with a pipe or conduit 128 for the flash pilot burner 126.

In this embodiment means are provided to effect a complete shut-off of fuel to both the main and pilot burners, such as the main burner 122 and the ignition pilot burner 132, whenever the control is in its "Off" position. As is shown more clearly in Figs. 6 and 7, the cup-shaped element 72 is adapted to operate a valve actuating member 152 in the form of a ball which projects partly within the inlet chamber 12. The valve actuating member 152 is located diametrically opposite the auxiliary valve member 84 but may be somewhat smaller in diameter to project from a smaller opening in the casing formed in a seat 154. The valve actuating member 152 is biased to its seat 154 by a flexible diaphragm 156 which is maintained in engagement with the bottom wall of a pilot valve chamber 158 by a valve housing 160 threadedly engaging the wall of the chamber 158. The valve housing 160 terminates short of the end of the chamber 158 and is spaced from a cap member 162 which also threadedly engages the wall of the chamber 158 and forms a closure therefor. The valve housing 160 is provided with an axial opening for the reception of a valve stem 164 which extends between the diaphragm 156 and a pilot control valve member 166 also in the form of a ball.

The pilot control valve member 166 is housed within a recess communicating with the axial opening in the housing 160 and defining a shoulder or valve seat 168 therebetween. A coil spring 169 is operative between the cap member 162 and valve member 166 for biasing the latter to its seat. The valve stem 164 is non-circular or otherwise formed to permit passage of fuel beyond the valve seat 168 into a lateral passage 170 formed in the housing 160 adjacent the diaphragm 156. The lateral passage 170 communicates with an annular recess 172 formed in the housing 160 and communicating with a threaded outlet 174 for connection with a pipe or conduit 134. Passage of fuel to the chamber 158 between the housing 160 and the closure cap 162 is provided by an inlet opening 176 formed in the casing 140 substantially ninety degrees from the outlet opening 174.

The operation of the control illustrated in Figs. 4 to 7 inclusive will be apparent by reference to Fig. 6 and the illustration of the operating stages, Figs. 8a to 8h inclusive. As in the previous embodiment, when the reset button 76 is in the unoperated position shown in Figs. 8a and 8b, then the indicating flag 105 is in the position with the indicia "Off" visible through the window 96. The system is placed in operation by opening the main fuel cock 120 which permits fuel to flow to the casing 140 through the main fuel pipe 118. It will be noted, however, that the flow of fuel through the pipe 134 from the main fuel cock 120 does not go directly to the ignition pilot burner 132 but is under control of the pilot control valve 166. As in the previous embodiment, it may be assumed that fuel is already flowing to the top pilot burner 124 and that this burner is producing a flame.

When the reset button 76 is depressed the cup-shaped element 72 moves to the left as viewed in Fig. 4 and first engages the valve operating member 152 which causes the pilot control valve member 166 to be moved off its seat 168 against the bias of the spring 169. This stage is depicted in Figs. 8c and 8d. Fuel is then permitted to flow from the inlet opening 176 past the pilot control valve member 166 through passage 170, annular recess 172 and outlet opening 174 and through the pipe 134 to the ignition pilot burner 132. It will be noted that the diaphragm 156 serves to prevent leakage of pilot fuel from the chamber 158 into the inlet chamber 12 or from the inlet chamber 12 into the pilot valve control chamber 158.

Further operation of the reset button 76 will cause the cup-shaped member 72 to move the auxiliary valve member 84 off its seat 86 and permit fuel to flow to the flash pilot burner 126 through the passage 144, outlet 150 and pipe 128. At this time the closure disc 66 becomes engaged with its seat 68 and serves to close off the passage 22 against flow of fuel from the inlet chamber 12. The position shown in Figs. 8e and 8f is thus reached and the indicator flag 105 is positioned as described in connection with the previous embodiment with the "Light Pilot" position visible through the window 96. The fuel from the main fuel pipe 118 flows through the outlet 150 and the fuel pipe 128 to the flash pilot burner 126 where it is conducted by the flash-tube 130 to the top pilot burner 124. Upon ignition of the flash pilot burner 126, the fuel issuing from the ignition pilot burner 132 is ignited and the thermocouple 138 becomes sufficiently heated to generate a current for energizing the winding 46. When the horseshoe magnet becomes energized, the armature 40 is held in attracted position and the valve member 26 remains disengaged from its seat 24.

The reset button 76 may now be released to bring the parts to the position shown in Figs. 8g and 8h. The cup-shaped element 72 is moved sufficiently far back to discontinue the force exerted thereby on the auxiliary valve member 84 which thereupon closes. However, in this position the cup-shaped element 72 is still in engagement with the valve operating member 152 so that the pilot control valve member 166 remains disengaged from its seat. Thus, the flow of fuel to the ignition pilot burner 132 is not interrupted at the time that the flow of fuel to the flash pilot burner 126 is cut-off. The flow of fuel through the passage 22 to the outlet chamber 14 and by way of outlet 20 to the main burner 22 is no longer obstructed by the closure disc 56 so that the main burner 122 produces a flame.

When the horseshoe magnet 42 becomes deenergized, either by extinguishment of the pilot burner 132 or by operation of the main fuel cock 120 to shut off the flow of fuel, then the cup-shaped element 72 will return to neutral position permitting the safety valve 26 to become engaged with the seat 24. When the fuel to the main burner 122 is thus cut-off, the cup-shaped element 72 has also moved out of engagement with the valve operating member 152 and the pilot control valve member 166 becomes closed due to the bias of the spring 169. As the flow of fuel to the ignition pilot burner 132 is also cut-off by this operation of the pilot control valve member it will be apparent that there is a 100 per cent shut-off of fuel in this embodiment.

It will be apparent that a self-contained system for ignition and safety control of a domestic oven burner has been provided and that the control device disclosed finds a wide field of usefulness in connection with the flash-tube ignition and safety control systems disclosed in Figs. 3 and 8. It will be understood that various changes may be made in the details and construction of the parts within the scope of the appended claims without departing from the spirit of the invention.

We claim:

1. A safety control for fuel burners having main and pilot burners comprising a casing having a chamber therein, inlet and outlet openings communicating with said chamber and providing passage for fuel to the main burner, a safety shut-off valve controlling flow of fuel between said openings, electromagnetic means positioned in said casing and connected to said safety valve for holding the same in open position but being incapable of moving said safety valve to open position, a manually operable reset stem mounted in said casing and reciprocable from an "Off" to a "Pilot" position into operative engagement with said safety valve for opening the same and resetting said electromagnetic means, means responsive to the resetting operation of said stem for limiting retraction thereof to establish an "On" position when said valve is held in open position, means operatively associated with said safety valve for operation by said reset stem for interrupting flow of fuel between said openings to the main burner during the resetting operation, and means responsive to the positioning of said reset stem and visible exteriorly of said casing for indicating the position of said safety valve.

2. A safety control for fuel burners having main and pilot burners comprising a casing having a chamber therein, inlet and outlet openings communicating with said chamber and providing passage for fuel to the main burner, a safety shut-off valve controlling flow of fuel between said openings, electromagnetic means positioned in said casing and connected to said safty valve for holding the same in open position but being incapable of moving said safety valve to open position, an auxiliary valve in said casing for controlling passage of fuel from said inlet to the pilot burner, means biasing said auxiliary valve to closed position, a manually operable reset stem mounted in said casing and reciprocable from an "Off" to a "Pilot" position into operative engagement with said safety valve for opening the same and resetting said electromagnetic means, means responsive to the resetting operation of said stem for limiting retraction thereof to establish an "On" position when said safety valve is held in open position, means mounted on said stem for slidable movement in said casing into operative engagement with said auxiliary valve for opening the same during the resetting operation, means associated with said safety valve for operation by said reset stem for interrupting flow of fuel between said openings to the main burner during the resetting operation, and means responsive to the positioning of said reset stem and visible exteriorly of said casing for indicating the position of said auxiliary and safety valves.

3. Safety control and ignition apparatus for a main fuel burner and having a fuel supply pipe connected thereto, comprising means for igniting the main burner including a flash pilot burner in proximity thereto and having separate connection with said fuel supply pipe, a remote pilot burner, a flash tube extending between said pilot burners for conducting a flame therebetween, a safety device for controlling flow of fuel in said pipe to the main and flash pilot burners, said device including a shut-off valve for the main burner and electromagnetic means effective when energized for holding said shut-off valve open, a thermoelectric generator adapted to be heated by a flame at the main burner for energizing said electromagnetic means, an auxiliary valve in said device yieldingly held closed for controlling flow of fuel to said flash pilot burner, manually actuable means operatively associated with said device and operable to a "Pilot" position for holding said auxiliary valve open until said thermoelectric generator has become heated, and means responsive to the positioning of said manually actuable means and visible exteriorly of said device for indicating the position of said auxiliary and said shut-off valves.

4. Safety control and ignition apparatus for a main fuel burner and having a fuel supply pipe connected thereto, comprising means for igniting the main burner including a flash pilot burner in proximity thereto and having separate connection with said fuel supply pipe, a remote pilot burner, a flash tube extending between said pilot burners for conducting a flame therebetween, a safety device for controlling flow of fuel in said pipe to the main and flash pilot burners, said device including a shut-off valve for the main burner and electromagnetic means effective when energized for holding said shut-off valve open but being incapable of moving the same to open position, a thermoelectric generator adapted to be heated by a flame at the main burner for energizing said electromagnetic means, an auxiliary valve in said device yieldingly held closed for controlling flow of fuel to said flash pilot burner, manually actuable means operatively associated with said device and operable from an "Off" to a "Pilot" position for holding said auxiliary valve open and simultaneously opening said shut-off valve and resetting said electromagnetic means, means responsive to the resetting operation of said manually actuable means for limiting retraction thereof to establish an "On" position when said shut-off valve is held in open position, and means responsive to the positioning of said manually actuable means and visible exteriorly of said device for indicating the position of said auxiliary and said shut-off valves.

5. Safety control and ignition apparatus for a main fuel burner and having a fuel supply pipe connected thereto, comprising means for igniting the main burner including a flash pilot burner in proximity thereto and having separate connection with said fuel supply pipe, a remote pilot burner, a flash tube extending between said pilot burners for conducting a flame therebetween, an ignition pilot burner between said flash pilot burner and the main burner and having connection with said fuel supply pipe separate from said flash pilot and main burners, a safety device for controlling flow of fuel in said pipe to the main burner and said pilot burners, said device including a shut-off valve for the main burner and electromagnetic means effective when energized for holding said shut-off valve open but being incapable of moving the same to open position, a pair of auxiliary valves in said device yieldingly held closed for controlling flow of fuel to said pilot burners, manually actuable means operatively associated with said device and operable to a "Pilot" position for opening said auxiliary and said shut-off valves, and means responsive to the positioning of said manually actuable means and visible exteriorly of said device for indicating the position of said auxiliary and said shut-off valves.

6. A safety control for fuel burners having main and pilot burners comprising a casing having a chamber therein, inlet and outlet openings communicating with said chamber and providing passage for fuel to the main burner, a safety shut-off valve controlling flow of fuel between said openings, electromagnetic means positioned in said casing and connected to said safety valve for holding the same in open position but being incapable of moving said safety valve to open position, a manually operable reset stem mounted in said casing and reciprocable from an "Off" to a "Pilot" position into operative engagement with said safety valve for opening the same and resetting said electromagnetic means, means operative between said safety valve and said stem for limiting retraction of the latter to establish an "On" position when said safety valve is held in open position, means operatively associated with said safety valve for operation by said reset stem to a position for interrupting flow of fuel between said openings to the main burner during the resetting operation, and means operative between said reset stem and said flow interrupting means for returning the latter to an inoperative position upon retraction of said reset stem and while said safety valve remains open.

7. A safety control for fuel burners having main and pilot burners comprising a casing having a chamber therein, inlet and outlet openings communicating with said chamber and providing passage for fuel to the main burner, a safety shut-off valve controlling flow of fuel between said openings, electromagnetic means positioned in said casing and connected to said safety valve for holding the same in open position but being incapable of moving said safety valve to open position, a manually operable reset stem mounted in said casing and reciprocable from an "Off" to a "Pilot" position into operative engagement with said safety valve for opening the same and resetting said electromagnetic means, means responsive to the resetting operation of said stem for limiting retraction thereof to establish an "On" position when said safety valve is held in open position, means operatively associated with said safety valve for operation by said reset stem to a position for interrupting flow of fuel between said openings to the main burner during the resetting operation, means operative between said reset stem and said flow interrupting means for returning the latter to an inoperative position upon retraction of said reset stem to said "On" position and while said safety valve remains open, and an indicator visible exteriorly of said casing and operable by said reset stem, said indicator having the "On" position intermediate the other said positions and being reached in the limited retracted position of said stem.

8. A safety control for fuel burners having main and pilot burners comprising a casing having a chamber therein, inlet and outlet openings communicating with said chamber and providing passage for fuel to the main burner, a safety shut-off valve controlling flow of fuel between said openings and provided with a valve stem, electromagnetic means positioned in said casing and connected to said safety valve for holding the same in open position but being incapable of moving said safety valve to open position, a manually operable reset stem mounted in said casing and having lost-motion connection with said valve stem, said reset stem being reciprocable relative to said valve stem from an "Off" position into operative engagement with said safety valve and thereafter being reciprocable jointly with said valve stem to a "Pilot" position for opening said safety valve and resetting said electromagnetic means, said lost motion connection being effective for limiting retraction of said reset stem to establish an "On" position when said safety valve is held in open position, and means mounted on said reset stem and operable thereby for interrupting the flow of fuel between said openings to the main burner during the resetting operation, said reset stem having a lost motion connection with said flow interrupting means for continued operation of said reset stem after said flow interrupting means is operative, said lost motion connection between said flow interrupting means and said reset stem being effective for rendering said flow interrupting means inoperative upon retraction of said reset stem to said "On" position.

9. A safety control device comprising a safety valve member biased to closed position, a valve stem projecting from said valve member, electromagnetic means for holding said valve member in open position, a reset stem reciprocable relatively to said valve stem and being operable for resetting said electromagnetic means and said valve member to open position, yieldable means operable between said valve stem and said reset stem for biasing the latter to a retracted position, and interengaging means on said valve stem and said reset stem for limiting said retraction when said valve member is held in open position.

10. A safety control device comprising a safety valve member biased to closed position, a valve stem projecting from said valve member, electromagnetic means including an armature adapted when in attracted position for holding said valve member in open position, a reset stem reciprocable relatively to said valve stem and being operable for resetting said armature to attracted position and said valve member to open position, oppositely disposed abutments on said valve stem and said reset stem respectively, yieldable means operable between said abutments for biasing said reset stem to a retracted position, and means secured to said reset stem and reciprocable therewith relative to said valve stem into engagement with the abutment thereon for limiting said retraction when said valve member is held in open position.

11. A safety control device comprising a safety valve member biased to closed position, a valve stem projecting from one side of said valve member, electromagnetic means including an armature secured to the opposite side of said valve member and adapted when in attracted position for holding said valve member in open position, a hollow reset stem telescopically mounted on said valve stem and being operable for resetting said armature to attracted position and said valve member to open position, oppositely disposed abutments on said valve stem and said reset stem respectively, yieldable means operable between said abutments for biasing said reset stem to a retracted position, a thimble secured to said reset stem and reciprocable therewith relative to said valve stem into engagement with the abutment thereon on the side opposite said yieldable means, said engagement being adapted to limit the retraction of said reset stem when said valve member is held in open position, and means responsive to the positioning of said reset stem for indicating the position of said valve member.

12. A safety control device comprising a casing having a chamber therein, inlet and outlet openings communicating with said chamber, a safety valve member biased to closed position for controlling said openings, a valve stem projecting from one side of said valve member, electromagnetic means including an armature secured to the opposite side of said valve member and adapted when in attracted position for holding said valve member in open position, a hollow reset stem telescopically mounted on said valve stem and being operable for resetting said armature to attracted position and said valve member to open position, oppositely disposed first and second abutments on said valve stem and said reset stem respectively, yieldable means operable between said abutments for biasing said reset stem to a retracted position, a thimble secured to said reset stem and projecting therefrom for reciprocable movement therewith relative to said valve stem, said thimble being engageable with said valve member in one direction and with the first abutment on said valve stem in the opposite direction for respectively moving the valve member to open position during the resetting operation and limiting the retraction of said reset stem when said valve member is held in open position, flow interrupting means mounted on said reset stem and cooperable with said second abutment thereon for controlling said openings during the resetting operation, yieldable means for positioning said flow interrupting means relative to said second abutment, auxiliary valve means in said casing and means forming an abutment for the last said yieldable means and operable by said reset stem for operating said auxiliary valve means.

13. A safety control device comprising a safety valve member biased to closed position, a valve stem projecting from said valve member, electromagnetic means including an armature adapted when in attracted position for holding said valve member in open position, a reset stem reciprocable relatively to said valve stem and being operable for resetting said armature to attracted position and said valve member to open position, oppositely disposed abutments on said valve stem and said reset stem, yieldable means operable between said abutments for biasing said reset stem to a retracted position, means secured to said reset stem and reciprocable therewith relative to said valve stem into engagement with the abutment thereon for limiting said retraction when said valve member is held in open position, auxiliary valve means biased to closed position, and means carried by said reset stem for opening said auxiliary valve means during the resetting operation and maintaining the same open when the retraction of said reset stem is limited.

14. A safety control device comprising a safety valve member biased to closed position, a valve stem projecting from said valve member, electromagnetic means including an armature adapted when in attracted position for holding said valve member in open position, a reset stem reciprocable relatively to said valve stem and being operable for resetting said armature to attracted position and said valve member to open position, oppositely disposed abutments on said valve stem and said reset stem, yieldable means operable between said abutments for biasing said reset stem to a retracted position, means secured to said reset stem and reciprocable therewith relative to said valve stem into engagement with the abutment thereon for limiting said retraction when said valve member is held in open position, a pair of auxiliary valves biased to closed position, and means carried by said reset stem for opening said auxiliary valves during the resetting operation and maintaining at least one said valve open when retraction of said reset stem is limited.

15. A safety control device comprising a casing having a chamber therein, inlet and outlet openings in said chamber, a valve seat intersecting said openings, a valve member biased to closed position relative to said valve seat for controlling said openings, an armature, an electromagnet cooperable with said armature to hold said valve member in open position relative to said valve seat, means for resetting said armature into cooperation with said electromagnet and said valve member into open position, flow interrupting means actuated to closed position relative to said valve seat by the resetting operation of said resetting means to control said openings during the resetting operation, means responsive to operation of said resetting means for limiting retraction of said resetting means following the resetting operation, and a pair of auxiliary valves in said chamber on the inlet side of said valve seat and being biased to closed position, said auxiliary valves being positioned for sequential operation to open position by engagement with said flow interrupting means during said resetting operation and at least one of said auxiliary valves being maintained in open position by said engagement when retraction of said reset stem is limited.

16. In a main burner lighting system, the combination of a main burner adapted to be connected to a source of fuel, ignition means for said main burner, a safety valve controlling the flow of fuel to said main burner and having an open and closed position, said valve being normally biased to its closed position, means for moving said valve to its open position, means responsive to the heat of said ignition means for holding said safety valve in an open position, a stand-by pilot burner in lighting proximity to said main burner and arranged to be connected to a source of fuel, auxiliary valve means for controlling the flow of gas to said stand-by pilot burner and having an open and a closed position, said valve means being biased to a closed position and linkage means for interconnecting said valve means with said safety valve for moving said valve means to an open position upon movement of the safety valve to its open position to maintain a flow of fuel to said stand-by pilot burner while said safety valve is open.

17. In a main burner lighting system, the combination of a main burner adapted to be connected to a source of fuel, ignition means for said main burner, a safety valve controlling the flow of fuel to said main burner and having an open and a closed position, means for normally biasing said safety valve to its closed position, means for moving said safety valve to its open position, means responsive to the heat of said ignition means for holding said safety valve in an open position, stand-by ignition means in lighting proximity with said main burner, auxiliary control means for controlling said stand-by ignition means having a position in which said stand-by ignition means is operative to ignite said main burner and a position in which said stand-by ignition means is inoperative for lighting said main burner, and linkage means operatively interconnecting said control means and said safety valve for moving said control means from its inoperative to its operative position upon movement of said safety valve to its open position to maintain said stand-by ignition means in its operative position for igniting said main burner so long as said safety valve is open.

18. In a burner control system of the class wherein there is a main burner, pilot burner means for lighting said main burner, said pilot burner means comprising a first pilot burner, a fuel supply line for supplying fuel to said main burner, a fuel supply line for supplying fuel to said first pilot burner, a safety shutoff valve in the fuel supply line for the main burner and operable to closed position to shut off the supply of fuel to said main burner, valve means in the fuel supply line for said first pilot burner and operable to closed position when said safety shutoff valve in the fuel supply line for the main burner is open, whereby to shut off the supply of fuel to said first pilot burner, the combination with said system of stand-by pilot burner means in juxtaposition to the main burner for relighting said main burner when the safety shutoff valve in the fuel supply line to the main burner is in open position and the valve means in the fuel supply line for said first pilot burner is closed.

19. A burner control system according to claim 18 wherein the safety shutoff valve in the fuel supply line for the main burner is under the control of an electromagnet connected in circuit with a thermoelectric generator subject to the heat of said pilot burner means.

20. Ignition and control apparatus for fluid fuel burning appliances having a main burner and a source of fuel comprising ignition means for the main burner, safety valve means movable between open and closed positions for controlling fuel flow from the source to the main burner, means responsive to the heat of said ignition means and operative when sufficiently heated to maintain said safety valve means in said open position, means for producing a stand-by pilot flame in lighting proximity to the main burner and arranged to be connected to the source of fuel, auxiliary valve means movable between open and closed position for controlling fuel flow from the source to said last named means, and means for interconnecting said auxiliary valve means with said safety valve means for moving said auxiliary valve means to said open position thereof upon movement of said safety valve means to said open position thereof to maintain a flow of fuel to said stand-by pilot means while said safety valve means is open.

References Cited in the file of this patent

UNITED STATES PATENTS

| Number | Name | Date |
|---|---|---|
| 2,297,854 | Alfrey | Oct. 6, 1942 |
| 2,361,944 | Jackson et al. | Nov. 7, 1944 |
| 2,379,712 | Hildebrecht | July 3, 1945 |